United States Patent [19]

Verdelet

[11] Patent Number: 4,601,459
[45] Date of Patent: Jul. 22, 1986

[54] IMPROVED BUTTERFLY VALVE

[75] Inventor: Alain B. A. Verdelet, Saint Valery en Caux, France

[73] Assignee: Masoneilan International Inc., Dallas, Tex.

[21] Appl. No.: 668,553

[22] Filed: Nov. 2, 1984

[30] Foreign Application Priority Data

Nov. 7, 1983 [FR] France ............................. 83 17656

[51] Int. Cl.[4] ............................................. F16K 1/226
[52] U.S. Cl. ..................................... 251/306; 251/305
[58] Field of Search ................................ 251/305, 306

[56] References Cited

U.S. PATENT DOCUMENTS

| 3,275,289 | 9/1966 | Fawkes . | |
|---|---|---|---|
| 3,521,857 | 7/1970 | Over ................................... | 251/305 |
| 3,931,955 | 1/1976 | Jacobs ................................. | 251/305 |
| 4,037,819 | 7/1977 | Kindersley ...................... | 251/305 X |
| 4,281,817 | 8/1981 | Adams et al. ................... | 251/305 |
| 4,284,264 | 8/1981 | Hubertson ...................... | 251/306 X |
| 4,436,281 | 3/1984 | Chiron ............................ | 251/306 X |
| 4,480,815 | 11/1984 | Kreij ............................... | 251/306 X |

FOREIGN PATENT DOCUMENTS

| 1305717 | 10/1962 | France . | |
| 1471931 | 3/1965 | France . | |
| 2144236 | 1/1973 | France . | |
| 2247653 | 10/1975 | France . | |
| 302526 | 12/1928 | United Kingdom ................. | 251/305 |

Primary Examiner—A. Michael Chambers
Assistant Examiner—John C. Fox
Attorney, Agent, or Firm—Daniel Rubin

[57] ABSTRACT

A butterfly valve comprising a body 1, a passage 2 extending through the body, a closure or butterfly member 3 mounted in the passage 2 to pivot about an axis orthogonal to the axis of the passage so as to be movable between a closing position in which a sealing element fixed or formed on the periphery of the disc of the closure member has a sealing contact with a seat 8 carried by the body and a fully open position roughly perpendicular to the closing position, the peripheral surface of the closure member 3 and the conjugate surface of the seat 8 being conical surfaces defined by two cones of revolution, while the axis of rotation of the closing member is offset along the axis of the passage in a direction away from the apex of the cone defining the surface of the seat relative to the mean plane of the disc of the closing member, wherein for a given value of the apex angle $2\phi$ of the cone $C_1$ defining the seat of the valve and for a given position C of the axis of rotation of the butterfly member in an orthonormal system $Ox,y,z$ of which one of the axes is coincident with the axis of said cone, there is defined a joint plane of the butterfly member with its seat of which a couple of points in respect of which the minimum angle of disengagement is maximum, has for trace a point Q located in the plane $(Ox,z)$ of the system and of which the coordinates and the angle of disengagement are given by the following approximate relations:

$$X_Q = \sin\phi \cos\phi (1 - C^2)$$

$$Z_Q = c(1 - \sin^2\phi (1 - C^2))$$

$$\sin\delta_Q = -\frac{c}{\cos\phi} \sqrt{\frac{1}{1 + C^2 \tan^2}}$$

5 Claims, 5 Drawing Figures

IMPROVED BUTTERFLY VALVE

The present invention relates to a valve of the butterfly type comprising a tubular body which defines a flow conduit and a butterfly closure member mounted in said body to rotate about an axis transverse to the axis of the conduit, one of the two elements carrying a sealing element, and the other a seat surface for this sealing element.

French Pat. No. 2 456 271 discloses a butterfly valve comprising a body through which extends a passage in which a closure member or butterfly is mounted to rotate about an axis perpendicular to the axis of the passage so as to be movable between a closing position in which a sealing element fixed on or formed on the periphery of the disc of the closure member has fluid-tight contact with a seat carried by the body, and a fully open position in which it is roughly perpendicular to the closing position, the peripheral surface of the closure member and the conjugate surface of the seat being conical surfaces defined by two cones of revolution having, in respect of the closing position, a common axis which makes, with the axis of the passage, an acute angle, while the axis of rotation of the closure member is, along the axis of the passage, offset away from the apex of the cone defining the surface of the seat relative to the mean plane of the disc of the closure member.

This butterfly valve is characterised in that the axis of rotation of the closure member is, relative to the axis of the passage, radially offset toward the apex of the cone defining the seat surface.

Good operation of a valve of this type depends on the following parameters:
the disengaging angle;
the pressure of contact of the sealing surfaces;
the shape of the sealing surfaces;
the rotational torque of the butterfly member.

An object of the invention is to provide a valve whose construction is the result of an optimum compromise between the aforementioned parameters.

The invention therefore provides a butterfly valve comprising a body through which extends a passage, a closure or butterfly member being mounted in said passage to rotate about an axis orthogonal to the axis of said passage so as to be movable between a closing position in which a sealing element fixed to or formed on the periphery of the disc of the closure member has a sealed contact with a seat carried by the body, and a fully open position in which it is roughly perpendicular to the closing position, the peripheral surface of the closure member and the conjugate surface of the seat being conical surfaces defined by two cones of revolution, while the axis of rotation of the closure member is offset along the axis of the passage away from the apex of the cone defining the seat surface relative to the mean plane of the disc of the closure member, wherein for a given value of the apex angle $2\phi$ of the cone defining the seat of the valve and, for a given position C of the axis of rotation of the butterfly member in an orthonormal system $\vec{Ox}, \vec{y}, \vec{z}$, one of the axes of which coincides with the axis of said cone, there is defined a joint plane of the butterfly member of the valve with its seat, of which a couple of points for which the minimum disengagement angle is maximum, has for trace a point Q located in the plane $(\vec{Ox}, \vec{z})$ of the system and of which the coordinates and the disengagement angle are given by the following approximate relations:

$X_Q = \sin\phi \cos\phi (1 - C^2)$
$Z_Q = c(1 - \sin^2\phi(1 - C^2))$ $$\sin\delta_Q = \frac{c}{\cos\phi} \cdot \frac{1}{1 + C^2 \tan^2\phi}$$

in which C is the distance between the trace of the axis of rotation of the butterfly member and the centre 0 of the system, the inclination $\theta$ of the butterfly member on the axis of the passage being given by the relation complement of the wedging or blocking angle $> \theta > (\pi/4)$.

A better understanding of the invention will be had from the following description with reference to the accompanying drawings, which are given solely by way of example and in which.

Figure 3:
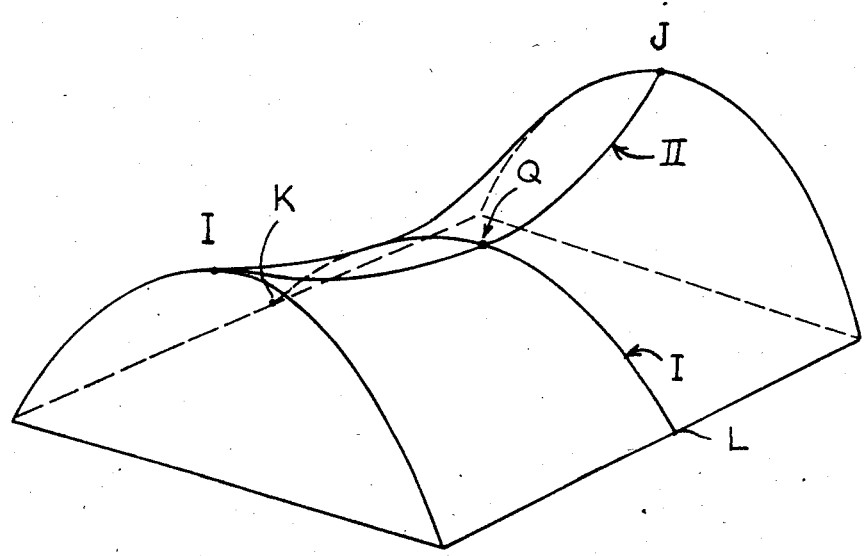
Figure 5:
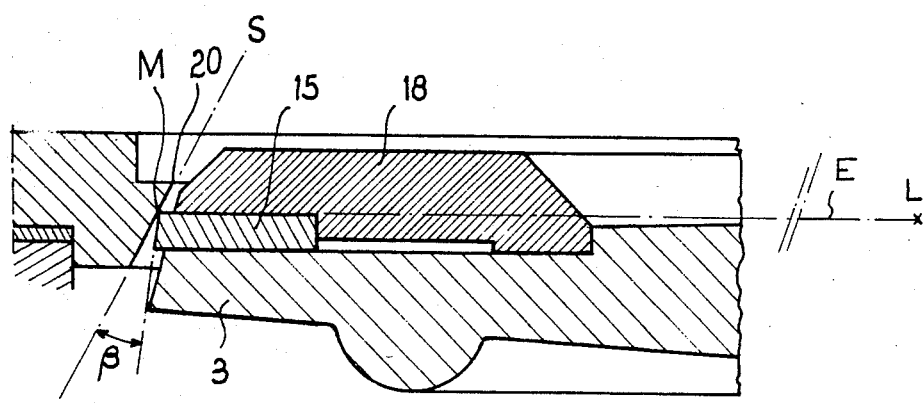
Figure 4:
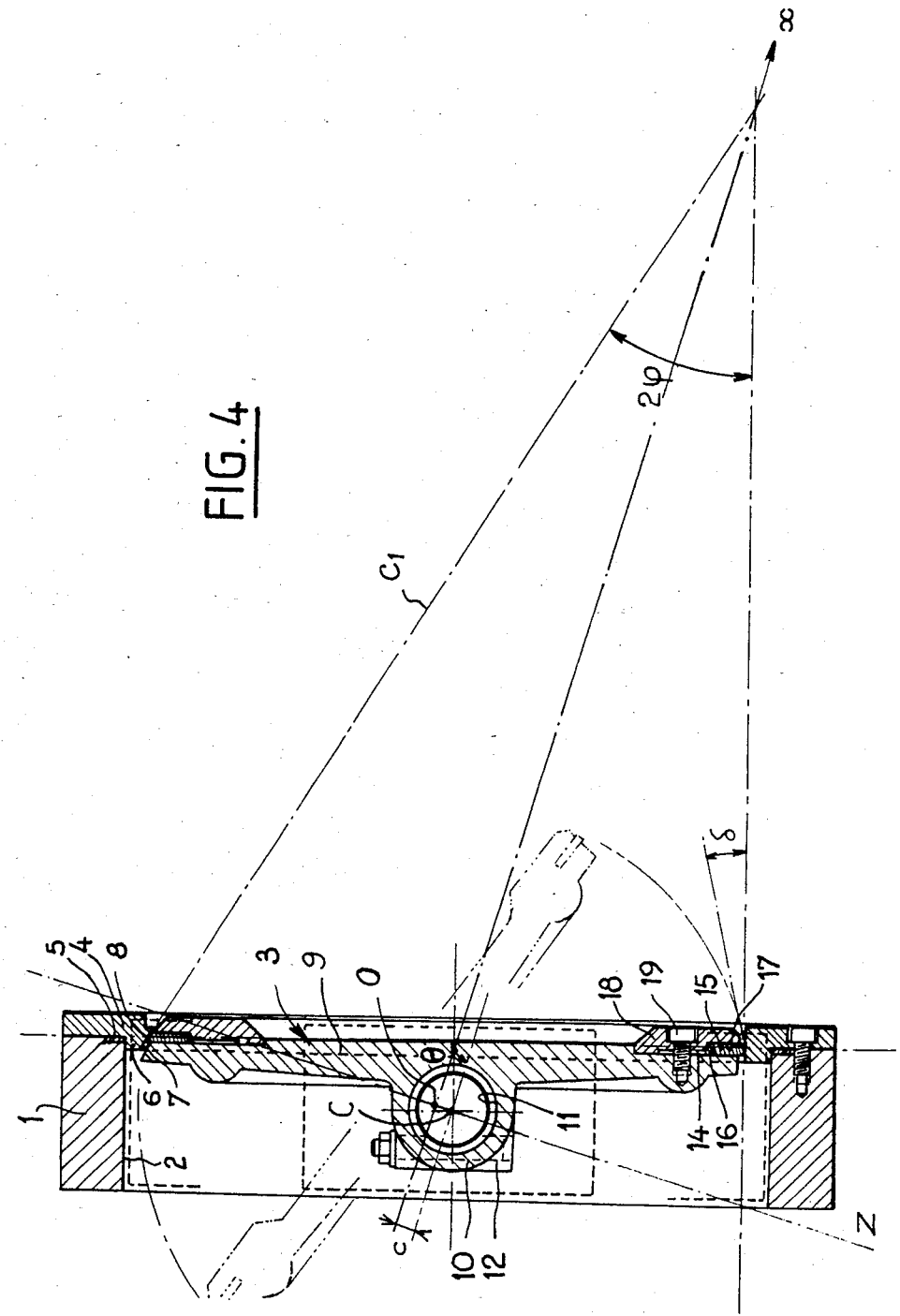

FIG. 3 diagrammatically shows the graphical determination of a point Q of a joint plane in respect of which the minimum disengagement angle is maximum;

FIG. 4 is a sectional view of a particular embodiment of a valve according to the invention, and FIG. 5 is a partial view to an enlarged scale.

Before giving the description of the valve according to the invention, there will be given an idea of the formulation of the problem that the Applicant had to solve, bearing in mind the parameters of operation mentioned before.

It will be assumed that the seat of the valve is carried by a part of a cone of revolution $C_1$ which is fixed and has an apex angle $2\phi$ and that the butterfly member is formed by a part of a cone $C_2$ which is movable and coincides with the cone $C_1$ in the closed position.

The cone $C_2$ is made to rotate about an axis orthogonal to the axis of revolution of the cone $C_1$.

When the part of the cone $C_2$ undergoes an infinitely small rotation about the axis defined above, there is calculated at each point of the cone $C_2$, the angle that the trajectory $t$ of $C_2$ makes with the normal $\vec{n}$ to the cone $C_1$, $\vec{n}$ and $\vec{t}$ being unitary vectors.

If this angle is less than 90°, the trajectory is engaging.

If it is greater than 90°, the trajectory is disengaging.

The butterfly member of the valve must therefore be cut in the parts of the cone $C_2$ where the angle of the trajectory is at least equal to the friction angle.

The pressure of contact of the sealing surfaces is a parameter which also intervenes in the construction and operation of a valve.

This pressure is produced when the butterfly member is applied against its seat.

It will be assumed that the butterfly cut from the portion of a cone $C_2$ has a plastic or elastic periphery.

Figure 2:
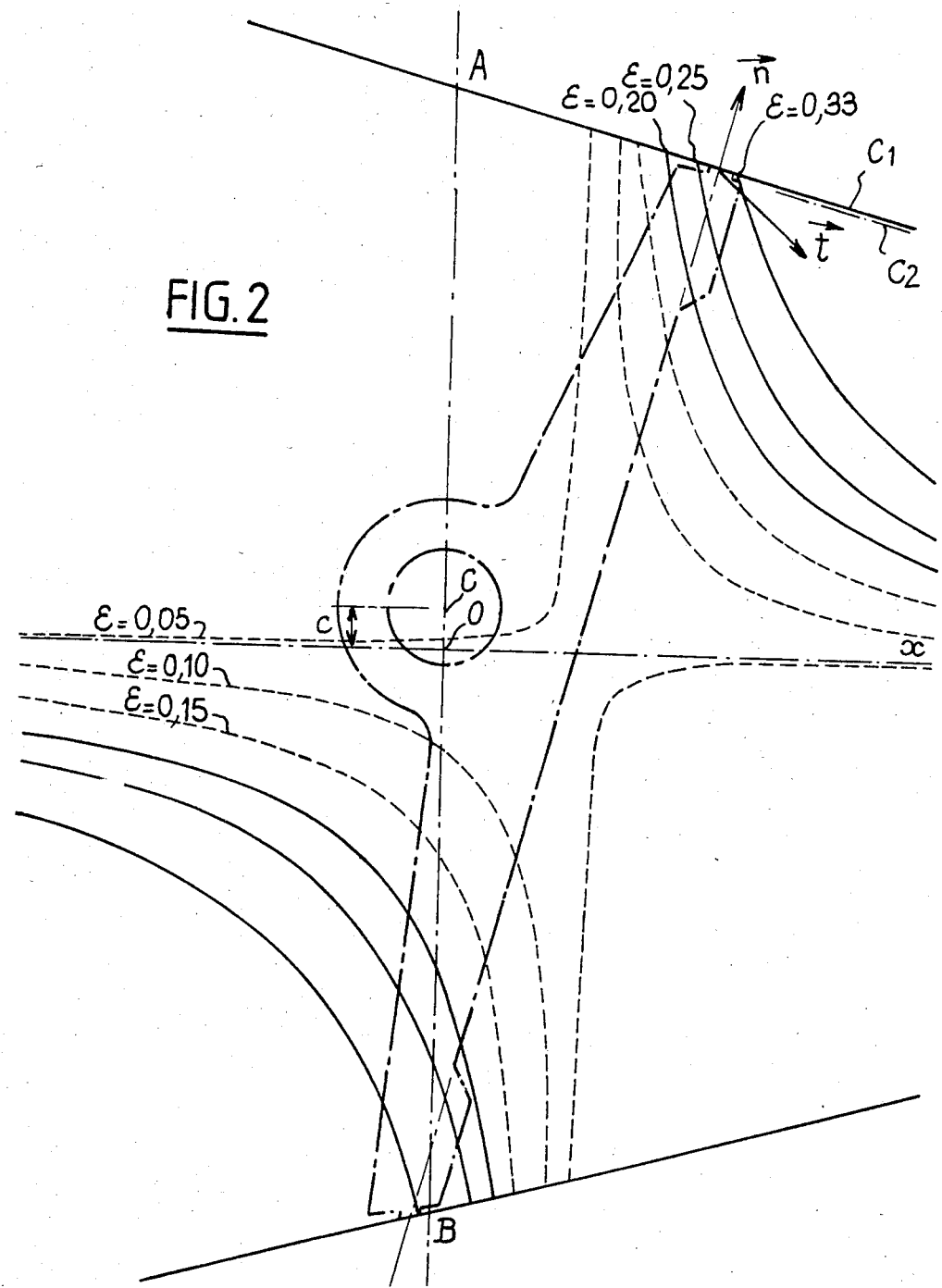
FIG. 2 is a diagram showing, on the same cone as that shown in FIG. 1, the curves of the constant values of the deformations or pressures of contact.

For a small angle of rotation, the deformation at a point of the portion of a cone $C_2$ depends on the minimum distance between said point and the axis of rotation of the butterfly member and the angle at this point between the normal $\vec{n}$ to the cone $C_1$ and the path $\vec{t}$ (FIG. 2).

The sealing surface of the butterfly member can also be of metal, in which case the aforementioned deformation is in fact a pressure of contact.

As for the angle of disengagement or clearance angle, this deformation or pressure will be calculated for each point of the cone $C_2$ bearing against the cone $C_1$.

The contour of the butterfly member must be so chosen that this deformation or pressure is the most homogeneous possible on the periphery of the butterfly member.

As concerns the shape of the sealing surfaces, there must be achieved approximate solutions which make use of the plasticity and elasticity of the peripheral sealing element, bearing in mind that the geometrically perfect solution would consist in associating a seat and a valve whose angles of conicity are different.

The rotational torque or operating torque of a butterfly valve is due to the compression of the sealing surface and to the pressure acting on the butterfly member and to the offset of the axis relative to the thrust centre of its surface.

In the case of a valve, this torque must be as small as possible.

Figure 1:
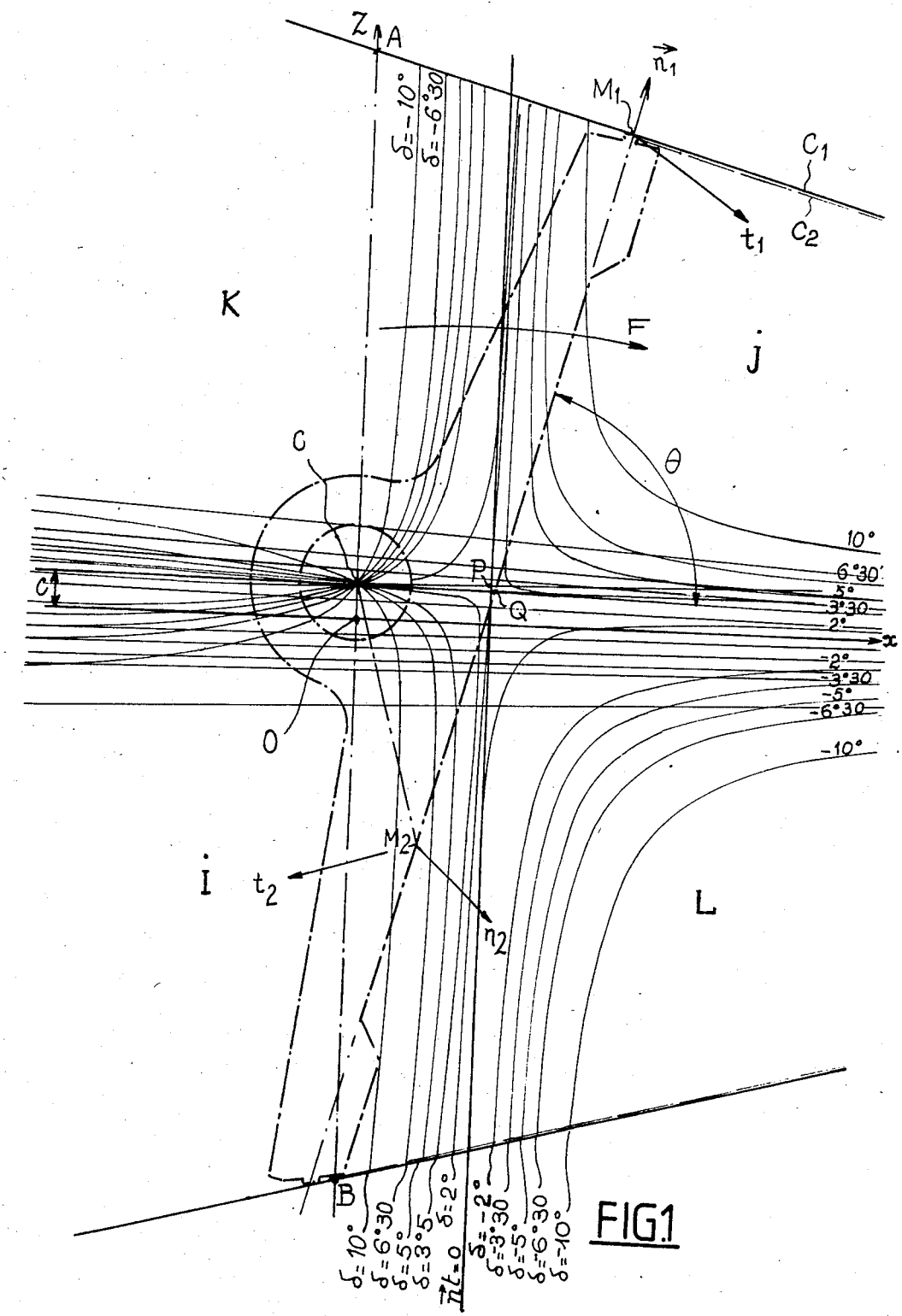
FIG. 1 is a diagram showing a cone defining the seat of a valve, the curves of the constant values of the disengagement angles and a valve butterfly member constructed in accordance with the invention.

With reference to the diagram shown in FIG. 1, it can be seen that an orthonormal system $\vec{ox}$, $\vec{oy}$, $\vec{oz}$ has been chosen.

The axis $\vec{ox}$ is the axis of the cone $C_1$ in which the seat is formed.

The arrow F indicates the direction of rotation of the butterfly member for opening the latter, namely rotation about an axis parallel to the axis $\vec{oy}$, the trace of this axis being indicated by a point C in FIG. 1.

Curves are then traced in the aforementioned system of coordinates, which interconnect the points of the cone $C_1$ having the same disengagement angle when the butterfly member rotates about the point C.

For this purpose, let: $OA = OB = 1$, the points A and B being the points of intersection of the axis $\vec{oz}$ with the cone $C_1$.

$$\vec{OC} = \vec{C}$$

The arbitrary choice of C pertaining to $\vec{oz}$ and of $OA = OB = 1$ in no way limits the generality of the solution. Indeed, any found solution produces an infinity of homothetic solutions.

The cosine of the angle between the normal n to the cone $C_1$ and the tangent t to the cone $C_2$ at a point M of contact between these cones is given by the scalar product of these two vectors.

$$\vec{n} \cdot \vec{t} = \frac{(z-c)\sin\phi - \dfrac{xz\cos\phi}{1 - x\tan\phi}}{\sqrt{x^2 + (z-c)^2}} \quad (1)$$

In this relation, x and z are the coordinates of the point M and $\phi$ is the semi-angle at the apex of the cone $C_1$.

The disengagement angle $\phi$ of the cone $C_2$ relative to the cone $C_1$ is defined by the relation $$\sin\delta = nt = \cos(n,t) \quad (2)$$

This relation permits tracing a chart of the angles of disengagement $\delta$ of all the points M of the cone $C_1$ in the zone of displacement of the butterfly member.

This chart is shown in FIG. 1 in the form of a series of curves having a hyperbolic shape established for various values of $\delta$.

It will be understood that if the scalar product $\vec{n},\vec{t}$ is $>0$, the path of the corresponding point M is "engaging".

If $\vec{n},\vec{t} < 0$, the path is "disengaging".

If $\vec{n},\vec{t} = 0$, the contact is sliding.

In this way there are defined in FIG. 1 the regions of the cone $C_1$ having "engaging" paths or "disengaging" paths.

According to the relation (1), curves where the angle $\delta$ is constant can be defined on the cone $C_1$.

For this purpose, let:

$$K = \frac{\sin\delta}{\sin\phi} \cdot u = \frac{x}{\tan\phi(1 - x\tan\phi)}$$

$$A = (1 - u)^2 - K^2$$
$$B' = C[1 - u - K^2]$$
$$C = C^2 - K^2(x^2 + C^2)$$

For an absolute value of $\delta$, the dimension z is obtained.

$$z = \frac{B'}{A} \pm \sqrt{\left(\frac{B'}{A}\right)^2 \frac{C}{A}} \quad (3)$$

The sign of z is determined from:

$$(z - c - zu)\sin\delta > 0 \quad (4)$$

It will be observed that the chart shown in FIG. 1 shows a group of projections on the plane of symmetry $\vec{Ox}\vec{z}$ of curves in fact located on the cone $C_1$.

Consequently, each point P of this plane is the orthogonal projection of two points $P_1$, $P_2$ of the cone $C_1$ which are symmetrical relative to this plane.

In order that the distance C between the centre of rotation of the butterfly member and the centre 0 of the orthonormal system be nil ($C = 0$), the sealing line between the butterfly member and the seat must be contained in a plane perpendicular to the axis $\vec{Ox}$ of the cone and therefore $\delta = 0$.

Consequently, in adopting a "screwing" direction of opening rotation for the butterfly member on the axis $\vec{Oy}$, the point C must be located above the axis $\vec{Ox}$.

Thus $OC = C$ owing to the condition $C > 0$.

The butterfly member must be cut in a zone defined by the equation of $\vec{n}, \vec{t}$ which gives a "disengaging" angle.

In proximity to the particular point P, termed pole, and which in fact corresponds to two points $P_1$ and $P_2$ of the cone, is a point Q termed the hyperbolic point.

The position of the point P is defined by the relations:

$x_p = \sin\phi \cos\phi$ $z_p = c$

At point P the angle $\delta$ is given by the relation:

$$(\sin\delta)_p = (\vec{n} \cdot \vec{t})_p = -\frac{c}{\cos\phi} \quad (5)$$

It is found, in looking at the zone of the point P and in considering four points JJKL each taken in a quadrant of the system $\vec{Oxz}$ that, in moving from I toward J so as to intersect the successive curves of $\delta$, this angle first of all decreases and then increases.

When moving from K toward L, $\delta$ first of all increases and then decreases.

This observation may be shown in FIG. 3 which represents a profil termed a hyperbolic bridge.

In order that $\delta$ be maximum throughout the periphery of the butterfly member, its joint plane must pass through the point located at the "top" of the line I and in the valley of the line II traced in FIG. 3.

This point, which is termed Q, is the point where the angle of minimum disengagement is maximum or the hyperbolic point.

In order to find this point, it is sufficient to solve the following system of equations:

$$\frac{\partial(\vec{n} \cdot \vec{t})}{\partial x} = 0$$

$$\frac{\partial(\vec{n} \cdot \vec{t})}{\partial z} = 0$$

and to verify that the curvatures of the curves I and II of FIG. 3 are opposed, and thus define a "horse saddle".

For $c \neq 0$, the solutions of this system of equations are the following:
for z:

$$z - c = -C \sin^2 \phi (1 - C^2) \qquad (6)$$

for x the three following values:

$$x = 0$$

$$x = C^2 \sin\phi \cos\phi$$

$$x = \sin\phi \cos\phi (1 - C^2) \qquad (7)$$

The exact values of the coordinates and of the angle $\delta$ of the point Q may be obtained from the following relation:

$$x^3_Q + (C^2 - 3)\sin\phi \cos\phi \, x^2_Q + [3\sin^2\phi \cos\phi + C^2\cos^2\phi(1 - 3\sin^2\phi)] x_Q + C^2 \sin\phi \cos^3\phi(2\sin^2\phi - 1) + C^4 \sin\phi \cos^5\phi - \sin^3\phi \cos^3\phi = 0. \qquad (8)$$

The approximate solutions of this equation are the following:

$$\begin{aligned} x_Q &= \sin\phi \cos\phi (1 - C^2) \quad (a) \\ z_Q - C &= -C \sin^2\phi (1 - C^2) \quad (b) \end{aligned} \qquad (9)$$

$$\vec{n} \cdot \vec{t}_Q = -\frac{c}{\cos\phi} \sqrt{\frac{1}{1 + C^2 \tan^2\phi}} \quad (c)$$

The precision of the approximate values given by these solutions is $\pm 5 \cdot 10^{-7}$ relative to the exact values, which is more than sufficient bearing in mind the machining tolerances.

If for technical reasons, it is decided to have a $\vec{n} \cdot \vec{t}$ minimum obtained at point Q, there are obtained couples of parameters $(c, \phi)$ satisfying the conditions determined by the relation (c).

The chart of the disengaging angles shown in FIG. 1 enables the angle of inclination $\theta$ of the theoretical sealing line around the point Q defined above to be chosen.

The theoretical sealing line must pass through the point Q defined above so that the minimum of $\delta$ be as large as possible.

The "maximum of the minimum" of $\delta$ depends on $\phi$ and on c.

Thus it is possible to determine a $\delta$ maximum and to deduce therefrom the couples of values $\phi$, c.

$$\sin\delta_p = \frac{-c}{\cos\phi} \qquad (10)$$

The chart shown in FIG. 1 contributes to the determination of the angle of inclination $\theta$ of the theoretical sealing line along the point Q defined above so that the gradient of $\delta$ is maximum.

The optimum angle of disengagement having been determined, there must now be examined the conditions of operation of the valve as concerns the pressure of contact of the butterfly member against the seat or the plastic deformation of the sealing element.

Assuming that the sealing surfaces of the valve are elastic or plastic, their compression $\epsilon$ is given by the relation:

$$d\epsilon = \rho \sin \delta \, d\alpha$$

in which:

$\rho$ is the minimum distance of the sealing point relative to the axis of rotation;

$d\alpha$ is the infinitely small angle of rotation in the direction for closing upon the crushing of the sealing surface.

A geometry of the sealing element is required so that $\rho \sin \delta$ be as constant as possible at any point M of the periphery of the sealing element.

Thus, as seen above:

$$\sin \delta = \vec{n} \cdot \vec{t}$$
$$\rho = |\vec{CM}|$$

$$\vec{CM} = x \vec{x} + [\sqrt{(1 - x\tan\phi) - z^2}] \vec{y} + (z - c)\vec{z}$$

$$CM^2 = x_2 + (1 - x\tan\phi)^2 + C^2 - 2cz$$

The following expression must therefore be studied: $CM^2 \cdot (\vec{n} \cdot \vec{t})^2$ and the conditions for obtaining: $CM^2(\vec{n} \cdot \vec{t})^2 \approx$ Cte must be established.

The moment of closure $\vec{m}$ on the axis of rotation $\vec{Cy}$ of the butterfly member creates a pressure p on the seat.

If an infinitely small surface or area is considered in the vicinity of the point M $$\vec{dm} = \vec{DM} \, \vec{n} \, p \, ds$$

D being the orthogonal projection of M on the axis Oy.

The components on x and y of this moment are balanced, either by symmetry or by reaction on the supports.

Only the component on y, or operating moment, is of interest.

$$\vec{m_y} = \vec{dm} \cdot y = (\overrightarrow{DM}(\vec{n} \cdot p \cdot ds)) \cdot y$$

The ratio $$\epsilon = \frac{M_y}{p ds}$$

is characteristic of the elastic or plastic deformation of the sealing element of the sealing surface.

It, for example, represents the torque which must be exerted to obtain at point M a force of 1 Newton.

When all the calculations have been made, there is obtained:

$$\epsilon = (z - c) \sin\phi - \frac{z \times \cos\phi}{1 - x\tan\phi} \quad (11)$$

The value of z is obtained from this relation.

$$z = \frac{(1 - x\tan\phi)(c \sin\phi + \epsilon)}{(1 - \tan\phi)\sin\phi - x\cos\phi} \quad (12)$$

This function permits tracing on the cone $C_1$ a chart of the $\epsilon$ which results in a family of hyperbolas in the plane $\vec{Ox}\vec{z}$ with $\epsilon$ constant.

The shape of the curves of the constant $\epsilon$ is very similar to that of the curves of the constant $\delta$, which facilitates the choice of these two parameters so that they have compatible values.

The horizontal and vertical asymptotes of these curves are given by the expressions:

$$xa = \sin\phi \cos\phi$$

$$za = \sin\phi[c \sin\phi + \epsilon] \quad (13)$$

When $\epsilon$ tends to approach 0

$$\text{Lim } za = c \sin^2\phi$$

The variations in $\epsilon$ are given by the expressions $$\frac{\partial\epsilon}{\partial z} = \sin\phi - \frac{x \cos\phi}{1 - x\tan\phi}$$

is cancelled for $x = \sin\phi \cos\phi$ $$\frac{\partial\epsilon}{\partial x} = \frac{-z \cos\phi}{(1 - x\tan\phi)^2}$$

is cancelled for $z = 0$

There is therefore obtained at one end of $\epsilon$ for the point whose coordinates are
$x = \sin\phi \cos\phi$
$z = 0$
The value of $\epsilon$ is given by the relation $$\epsilon = -c \sin\phi$$

It will be observed that for $\epsilon = 0$ and $\delta = 0$, the hyperbolas corresponding to these values are identical and given by the relation:

$$z = \frac{c}{1 - \frac{x}{(1 - x\tan\phi)\tan\phi}}$$

Owing to the very similar shapes of the curves of the $\epsilon$ and the $\delta$, there is no difficulty in choosing the angle of inclination $\theta$ of the joint plane of the butterfly member on the axis of the seat.

It is advantageous to choose this angle in such manner that it is less than the complement of the wedging angle and greater than or equal to a limit value of about $(\pi/4)$.

The valve shown in FIG. 4 comprises a body 1 having a generally cylindrical shape whose bore 2 constitutes a passage for the fluid the circulation of which through the conduits (not shown) assembled with the body 1 is controlled by the closure member 3 which is mounted to rotate about a geometric axis YY. The trace of the axis of rotation is constituted by the point C in FIG. 1 whose coordinates give the offset of this point from the axis XX.

Fixed at the downstream end of the body 1 is a ring 4, a sealing element 5 being interposed between the body and the ring and the latter having a rabbet 6 whose inner bore forms the seat 7 for the peripheral surface 8 of a disc or plate 9 of the butterfly member 3. The principal part of the butterfly member is extended in the upstream direction by bosses 10 through each of which extends a cylindrical drilled aperture 11 having an axis YY, in which is engaged and secured by means of a key 12, a semi-pin 13 which is journalled in the body 1 and rotatively mounts the butterfly member.

In a deep peripheral groove 14 of the disc 9 is inserted an annular sealing element 15 which, in the closing position, is applied elastically at a pressure against the conjugate surface 8 of the seat. The peripheral groove 14 is defined by two complementary rabbets 16, 17 respectively formed in a surface of the principal part 3 and in the confronting surface of a counterplate 18 which is secured to the main part by screws 19.

The sealing material of the seat 7 and/or of the sealing element 15 is chosen in accordance with the conditions of utilization and may be in particular a plastics material which satisfies the required conditions of plasticity and elasticity or a metal.

FIG. 5 shows to an enlarged scale the relative angle between the sealing element of the butterfly member and the seat.

E is the mean line of the joint plane between the seat 8 and the butterfly member, this line being, in the present case, an ellipse.

A sealing surface is defined on the butterfly member generated by straight lines $\Delta$ so that a given angle $\beta$ is made at every point M of E with the generatrix SM of the $C_1$ in the plane defined by SM and the centre L of the ellipse E.

An edge 20 of contact between the sealing surface 8 of the seat 6 and that of the sealing element 15 can thus be obtained.

It can also be arranged that the sealing edge be defined on the sealing element by two surfaces which respectively make with the surface 8 of the seat acute angles $\beta$ and $\beta'$.

One of these angles $\beta$ or $\beta'$ may be equal to 0, in which case a part of the surface of the sealing element adjoins the corresponding surface of the seat.

Having established the characteristics of a butterfly valve by calculation, these characteristics may be easily materialized in the form of machining instructions for conventional machining tools, so as to produce the desired contours for the seat and the butterfly member of the valve.

What is claimed is:

1. In a butterfly valve comprising a body, a passage extending through said body and having an axis, a seat carried by the body and disposed in said passage, a closure member mounted in said passage for rotation about an axis orthogonal to the axis of said passage so as to be movable between a closing position in which a sealing element carried by a periphery of the closure member has a sealed contact with said seat and a fully open position substantially perpendicular to the closing position, a peripheral surface of the closure member and a conjugate surface of the seat being conical surfaces defined by two cones of revolution, the axis of rotation of the closing member being offset along the axis of the passage away from the apex of the cone defining the surface of the seat relative to a mean plane of the closure member, the improvement wherein, for a given value of the apex angle $2\phi$ of the cone defining the seat of the valve and for a given position C of the axis of rotation of the butterfly member in an orthonormal system $Ox,y,z$ in which the axis $Ox$ coincides with the axis of said cone, there is defined a joint plane of the butterfly member with its seat, of which a couple of points in respect of which a clearance angle which is maximum, has for trace a point Q located in the plane $(Ox, z)$ of the system having coordinates and a clearance angle given by the following approximate relations:

$$X_Q = \sin\phi \cos\phi (1 - C^2)$$

$$Z_Q = c(1 - \sin^2\phi (1 - C^2))$$

$$\sin\delta_Q = -\frac{c}{\cos\phi} \sqrt{\frac{1}{1 + C^2\tan^2\phi}}$$

in which C is the distance between the trace of the axis of rotation of the butterfly member and the centre 0 of the system and an inclination angle $\theta$ of the butterfly member relative to the axis of the passage being given by the relation: complement of the blocking angle $<\theta\leq(\pi/4)$.

2. A butterfly valve according to claim 1, wherein at least one of the sealing surfaces of the valve constituted by the seat and the sealing element of the butterfly member has a plastic deformation upon application of the butterfly member on the seat, its compression being given by the relation:

$$\epsilon = (z - c) \sin\phi - \frac{zx \cos\phi}{1 - x\tan\phi}$$

3. A butterfly valve according to claim 2, wherein the sealing surface between the butterfly member and its seat is generated by straight lines which make, at every point of a mean line of the joint plane between the seat and the butterfly member, a given angle with the generatrix of the cone defining the surface of contact of the seat and the centre of the mean line.

4. A butterfly valve according to claim 1, wherein at least one of the sealing surfaces of the valve constituted by the seat and the sealing element of the butterfly member has an elastic deformation upon application of the butterfly member on the seat, its compression being given by the relation:

$$\epsilon = (z - c) \sin\phi - \frac{zx \cos\phi}{1 - x\tan\phi}$$

5. A butterfly valve according to claim 1, wherein the sealing surface between the butterfly member and its seat is generated by straight lines which make, at every point of a mean line of the joint plane between the seat and the butterfly member, a given angle with the generatrix of the cone defining the surface of contact of the seat and the centre of the mean line.

* * * * *